i

US008066073B2

(12) United States Patent
Hutchins et al.

(10) Patent No.: US 8,066,073 B2
(45) Date of Patent: *Nov. 29, 2011

(54) METHODS OF LIMITING LEAK OFF AND DAMAGE IN HYDRAULIC FRACTURES

(75) Inventors: Richard D Hutchins, Sugar Land, TX (US); Marie Noelle Dessinges, Chatte (FR); Carlos Abad, Richmond, TX (US); Erik B Nelson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/473,025

(22) Filed: May 27, 2009

(65) Prior Publication Data
US 2009/0229822 A1 Sep. 17, 2009

Related U.S. Application Data

(63) Continuation of application No. 11/532,705, filed on Sep. 18, 2006, now Pat. No. 7,398,829, and a continuation of application No. 12/172,650, filed on Jul. 14, 2008, now Pat. No. 7,775,282.

(51) Int. Cl.
*E21B 43/267* (2006.01)
(52) U.S. Cl. .............. 166/308.3; 166/279; 166/280.1; 166/300
(58) Field of Classification Search ............... None
See application file for complete search history.

(56) References Cited

U.S. PATENT DOCUMENTS

| | | | |
|---|---|---|---|
| 3,711,405 A | 1/1973 | Pye et al. | |
| 3,815,680 A | 6/1974 | McGuire et al. | |
| 3,851,709 A | 12/1974 | Fitch et al. | |
| 4,107,057 A | 8/1978 | Dill et al. | |
| 4,233,165 A | 11/1980 | Salathiel et al. | |
| 4,456,067 A | 6/1984 | Pinner, Jr. | |
| 4,537,918 A | 8/1985 | Parcevaux et al. | |
| 4,579,668 A | 4/1986 | Messenger | |
| 4,809,783 A | 3/1989 | Hollenbeck et al. | |
| 5,009,267 A | 4/1991 | Williamson et al. | |
| 5,046,562 A | 9/1991 | Crema et al. | |
| 5,213,160 A | 5/1993 | Nahm et al. | |
| 5,227,422 A | 7/1993 | Mitsuji et al. | |
| 5,238,065 A | 8/1993 | Mondshine et al. | |
| 5,246,602 A * | 9/1993 | Forrest ................. | 166/283 |
| 5,318,382 A | 6/1994 | Cahill | |
| 5,325,921 A * | 7/1994 | Johnson et al. ......... | 166/280.1 |
| 6,069,118 A | 5/2000 | Hindel et al. | |
| 6,169,058 B1 | 1/2001 | Le et al. | |
| 6,171,386 B1 | 1/2001 | Sabins | |
| 6,192,985 B1 | 2/2001 | Hinkel et al. | |
| 6,234,251 B1 | 5/2001 | Chatterji et al. | |
| 6,271,181 B1 | 8/2001 | Chatterji et al. | |
| 6,306,800 B1 | 10/2001 | Samuel et al. | |
| 6,328,105 B1 | 12/2001 | Betzold | |
| 6,412,561 B1 | 7/2002 | Brown et al. | |
| 6,435,277 B1 | 8/2002 | Qu et al. | |
| 6,448,206 B1 | 9/2002 | Griffith et al. | |
| 6,555,507 B2 | 4/2003 | Chatterji et al. | |
| 6,599,863 B1 | 7/2003 | Palmer et al. | |
| 6,637,517 B2 | 10/2003 | Samuel et al. | |
| 6,703,351 B2 | 3/2004 | Stowe, II et al. | |
| 6,823,940 B2 | 11/2004 | Reddy et al. | |
| 6,935,426 B1 | 8/2005 | Rainbolt et al. | |
| 7,013,995 B2 | 3/2006 | Cranshaw et al. | |
| 7,066,260 B2 | 6/2006 | Sullivan et al. | |
| 7,219,731 B2 | 5/2007 | Sullivan et al. | |
| 7,299,875 B2 | 11/2007 | Nguyen et al. | |
| 7,334,635 B2 | 2/2008 | Nguyen | |
| 7,398,829 B2 * | 7/2008 | Hutchins et al. ........... | 166/308.3 |
| 2002/0023752 A1 | 2/2002 | Qu et al. | |
| 2002/0185278 A1 | 12/2002 | Brown et al. | |
| 2003/0019627 A1 | 1/2003 | Qu et al. | |
| 2003/0060374 A1 | 3/2003 | Cooke, Jr. | |
| 2005/0257932 A1 | 11/2005 | Davidson et al. | |
| 2006/0032636 A1 | 2/2006 | Lord et al. | |
| 2006/0041060 A1 | 2/2006 | George et al. | |
| 2006/0065397 A1 | 3/2006 | Nguyen et al. | |
| 2006/0102344 A1 | 5/2006 | Surjaatmadja et al. | |
| 2006/0144595 A1 | 7/2006 | Milligan et al. | |

FOREIGN PATENT DOCUMENTS

| | | |
|---|---|---|
| WO | 2006106287 | 10/2006 |
| WO | 2007063317 | 6/2007 |

OTHER PUBLICATIONS

SPE 26664—The Effects of Unbroken Fracture Fluid on Gaswell Performance—by Voneiff, G.W., Robinson, B. M. and Holditch, S.A.—SPE Production and Facilities, Nov. 1996.
SPE 38619—The Effect of Yield Stress on Fracture Fluid Cleanup—by May, E.A., Britt, L.K. and Nolte, K.G.—presented at the 1997 SPE Annual Technical Conference and Exhibition held in San Antonio TX Oct. 5-8, 1997.

* cited by examiner

*Primary Examiner* — Zakiya W Bates
(74) *Attorney, Agent, or Firm* — David Cate; Rachel Greene; Jeff Griffin

(57) ABSTRACT

Methods for treating a formation penetrated by a wellbore which improves fluid loss control during treatment. In some aspects, the treatments include preparing an aqueous fluid including one or more water inert polymers and an optional viscosifier, injecting the aqueous fluid into the wellbore at a pressure equal to or greater than the formation's fracture initiation pressure, and thereafter injecting into the wellbore a proppant laden fluid at a pressure equal to or greater than the formation's fracture initiation pressure. The water inert polymer may be a polymer such as an emulsion polymer or a latex polymer. Some methods of the invention use a fluid which may have a normalized leak off coefficient ($C_w/\sqrt{K}$) equal to or less than about 0.0022, 0.0014, or 0.0010. A conventional fluid loss additive may or may not be used in conjunction with the treatment fluid and/or the proppant laden fluid. The water inert polymer may or may not substantially enter formation pores. In another aspect, methods for reducing matrix damage to a formation during a treatment operation include preparing an aqueous treatment fluid formed of at least one water inert polymer, and injecting the fluid at a pressure equal or greater than the formation's fracture initiation pressure.

15 Claims, 11 Drawing Sheets

METHODS OF LIMITING LEAK OFF AND DAMAGE IN HYDRAULIC FRACTURES

This application is a continuation application of U.S. patent application Ser. No. 11/532,705, filed Sep. 18, 2006, now U.S. Pat. No. 7,398,829 and U.S. patent application Ser. No. 12/172,650, filed Jul. 14, 2008 now U.S. Pat. No. 7,775,282.

TECHNICAL FIELD OF THE INVENTION

This invention relates to improving the production of fluids from wells penetrating subterranean formations. More particularly, this invention relates to methods using stabilized aqueous dispersions of water inert polymers in treatment fluids to improve fluid efficiency during hydraulic fracture treatments while minimizing or preventing proppant pack damage.

BACKGROUND OF THE INVENTION

Hydraulic fracturing of oil or gas wells is a technique routinely used to improve or stimulate the recovery of hydrocarbons. In such wells, hydraulic fracturing is usually accomplished by introducing a proppant-laden treatment fluid into a producing interval at high pressures and at high rates sufficient to crack the rock open. This fluid induces a fracture in the reservoir as it leaks off in the surrounding formation and transports proppant into the fracture. After the treatment, proppant remains in the fracture in the form of a permeable and porous proppant pack that serves to maintain the fracture open as hydrocarbons are produced. In this way, the proppant pack forms a highly conductive pathway for hydrocarbons and/or other formation fluids to flow into the wellbore.

Typically, viscous fluids or foams are employed as fracturing fluids in order to provide a medium that will have sufficient viscosity to crack the rock open, adequately suspend and transport solid proppant materials, as well as decrease loss of fracture fluid to the formation during treatment (commonly referred to as "fluid loss"). While a reduced fluid loss allows for a better efficiency of the treatment, a higher fluid loss corresponds to fluids "wasted" in the reservoir, and implies a more expensive treatment. Also, it is known that the degree of fluid loss can significantly depend upon formation permeability. Furthermore fluid efficiency of a fracture fluid may affect fracture geometry, since the viscosity of the fluid might change as the fluid is lost in the formation. This is the case for polymer-based fracturing fluids that concentrate in lower permeability formations as the fracture propagates due to leak off of the water in the formation, while the polymer molecules remain in the fracture by simple size exclusion from the pores of the reservoir. The fluid in the fracture increases in viscosity as the fracture propagates and the fracture generated will also increase in width as well as in length. In the case of viscoelastic surfactant (VES) based fluids, the fracturing fluid does not concentrate since the fracturing fluid is lost in the formation and typically the fractures generated are long and very narrow. Hence, fluid efficiency affects fracture geometry.

For VES based fluids, excessive fluid loss results in fractures that are narrower than desired. Also, excessive fluid loss may translate into significant job size where hundreds of thousands of additional gallons of water may be pumped to generate the required length of fracture and overcome low fluid efficiency. Fracturing fluids should have a minimal leak-off rate to avoid fluid migration into the formation rocks and minimize the damage that the fracturing fluid or the water leaking off does to the formation. Also the fluid loss should be minimized such that the fracturing fluid remains in the fracture and can be more easily degraded, so as not to leave residual material that may prevent hydrocarbons to flow into the wellbore.

Early fracturing fluids were constituted of viscous or gelled oil but, with the understanding that formation damage due to water may not be as important as originally thought, aqueous fracturing fluids mainly consisting of "linear" polymeric gels comprising guar, derivatized guar, cellulose, or derivatized cellulose were introduced. In order to attain a sufficient fluid viscosity and thermal stability in high temperature reservoirs, linear polymer gels were partially replaced by cross-linked polymer gels such as those based on guar crosslinked with borate or polymers crosslinked with metallic ions. However, as it became apparent that crosslinked polymer gel residues might not degrade completely and leave a proppant pack with an impaired retained conductivity, fluids with lower polymer content were introduced. In addition, some additives were introduced to improve the cleanup of polymer-based fracturing fluids. These included polymer breakers. Nonetheless the polymer based fracturing treatments leave proppant pack with damaged retained conductivity since the polymer fluids concentrate in the fracture while the water leaks off in the reservoir that may impair the production of hydrocarbons from the reservoir.

Other fracturing fluids with improved cleanup, i.e. that leave a proppant pack with higher retained conductivity, have been developed. Examples are fluids that use viscoelastic surfactants (VES) as viscosifiers. The viscoelastic surfactant molecules, when present at a sufficient concentration, may aggregate into overlapping worm- or rod-like micelles, which confer the necessary viscosity to the fluid to carry the proppant during fracturing. At very high shear rate however, the viscosity may decrease. Also, the surfactant worm- or rod-like micelles tend to disaggregate by contact with hydrocarbons and, if no surfactant emulsion is effectively formed, the surfactant molecules are normally carried along the fracture, to the well bore, during the hydrocarbon backflow.

Yet another approach to limit the damage of the proppant pack, is to use water based treatments with friction reducers (referred as slickwater treatments), and pump the fracturing fluids at much higher rates in the formation. The proppant is carried to the formation due to the high flow rates. The limitation of the treatments is that the maximum proppant concentration that can be placed is limited to a small concentration since the fluid has low viscosity. Another limitation is very low fluid efficiency and therefore the size of the slickwater treatments.

Based on reservoir simulations and field data, it is commonly observed that production resulting from a fracturing treatment is often lower than expected. This phenomenon is particularly the case in tight gas formations. Indeed, production can be decreased significantly by concentrated polymer left in the fracture due to leak off of the fracturing fluid during treatment. Filter cakes may result in poor proppant pack cleanup due to the yield stress properties of the fluid. This may happen when a crosslinked polymer based fluid is pumped that leaks off into the matrix and becomes concentrated, and extremely difficult to remove. Breaker effectiveness may thus become reduced, and viscous fingering inside the proppant pack may occur which further results in poor cleanup. Furthermore, the filter cake yield stress created by the leak off process can occlude the fracture width and restrict fluid flow, resulting in a reduction in the effective fracture half-length.

Accordingly, there is a need for methods for treating subterranean formations using fluids which enable efficient pumping, which significantly decrease and control the leak off relative to conventional fracturing treatments in order to reduce the damage to the production, while having good cleanup properties as well as improved fluid efficiency (i.e. providing less expensive and time-consuming treatment). These needs are met, at least in part, with the following invention.

SUMMARY OF THE INVENTION

Disclosed are methods for treating a formation penetrated by a wellbore which improves fluid loss control during treatment. In some aspects, the methods are slickwater treatments which include preparing an aqueous fluid comprising at least one water inert polymer, where a viscosifier is not added to the aqueous fluid to substantially increase the fluid viscosity, then injecting the aqueous fluid into the wellbore at a pressure equal to or greater than the formation's fracture initiation pressure, and thereafter injecting into the wellbore a proppant laden fluid at a pressure equal to or greater than the formation's fracture initiation pressure. In some embodiments of the invention, the water inert polymer includes one or more emulsion polymers, while in other embodiments, the water inert polymer may be at least one latex polymer. When the water inert polymer is formed of a plurality of latexes, they may be a mixture of latexes of different particle sizes. Some methods of the invention use a fluid which may have a normalized leak off coefficient ($C_w$/sqrt(K)) equal to or less than about 0.0022, preferably equal to or less than about 0.0010. A conventional fluid loss additive may or may not be used in conjunction with the treatment fluid and/or the proppant laden fluid.

The water inert polymer may form a film on fracture faces, and the film may optionally be at least partially degraded during and/or subsequent to injecting the proppant laden fluid. When the film is degraded, it may be degraded with a breaker, such as a delayed breaker, a conventional oxidizer, an oxidizer triggered by catalysts contained in the film, a latent acid, or formation fluids. Also, the water inert polymer may or may not substantially enter the formation pores. Methods of the invention may use a fluid further including one or more of the following: a gas component, acid particles, colloidal particles, at least one friction pressure reducing agent, and the like.

In another aspect of the invention, the methods are formation treatments which include first preparing an aqueous pad fluid containing at least one water inert polymer and a viscosifier, injecting the aqueous fluid into the wellbore at a pressure equal to or greater than the formation's fracture initiation pressure, and injecting a proppant laden fluid at a pressure equal to or greater than the formation's fracture initiation pressure. While any suitable water inert polymer may be used, the polymer may be one or more latex or emulsion polymers. A conventional fluid loss additive may or may not be incorporated into the fluids, as well as any other commonly used additives or components. Some methods of the invention use a fluid which may have a normalized leak off coefficient equal to or less than about 0.0022, preferably equal to or less than about 0.0014, more preferable equal to or less than about 0.0010. Some examples of viscosifiers useful in the fluids include viscoelastic surfactants, natural polymers, derivatives of natural polymers, synthetic polymers, biopolymers, and the like, or any mixtures thereof. The water inert polymer may form a film on fracture faces, which may be subsequently degraded. The water inert polymer may or may not substantially enter formation pores.

In yet another aspect, disclosed are methods for reducing matrix damage to a formation during a treatment operation, by first preparing an aqueous treatment fluid formed of at least one water inert polymer, and injecting the fluid at a pressure equal or greater than the formation's fracture initiation pressure. The fluid may or may not include a viscosifier such as a polymer or viscoelastic surfactant.

DETAILED DESCRIPTION

Figure 1:
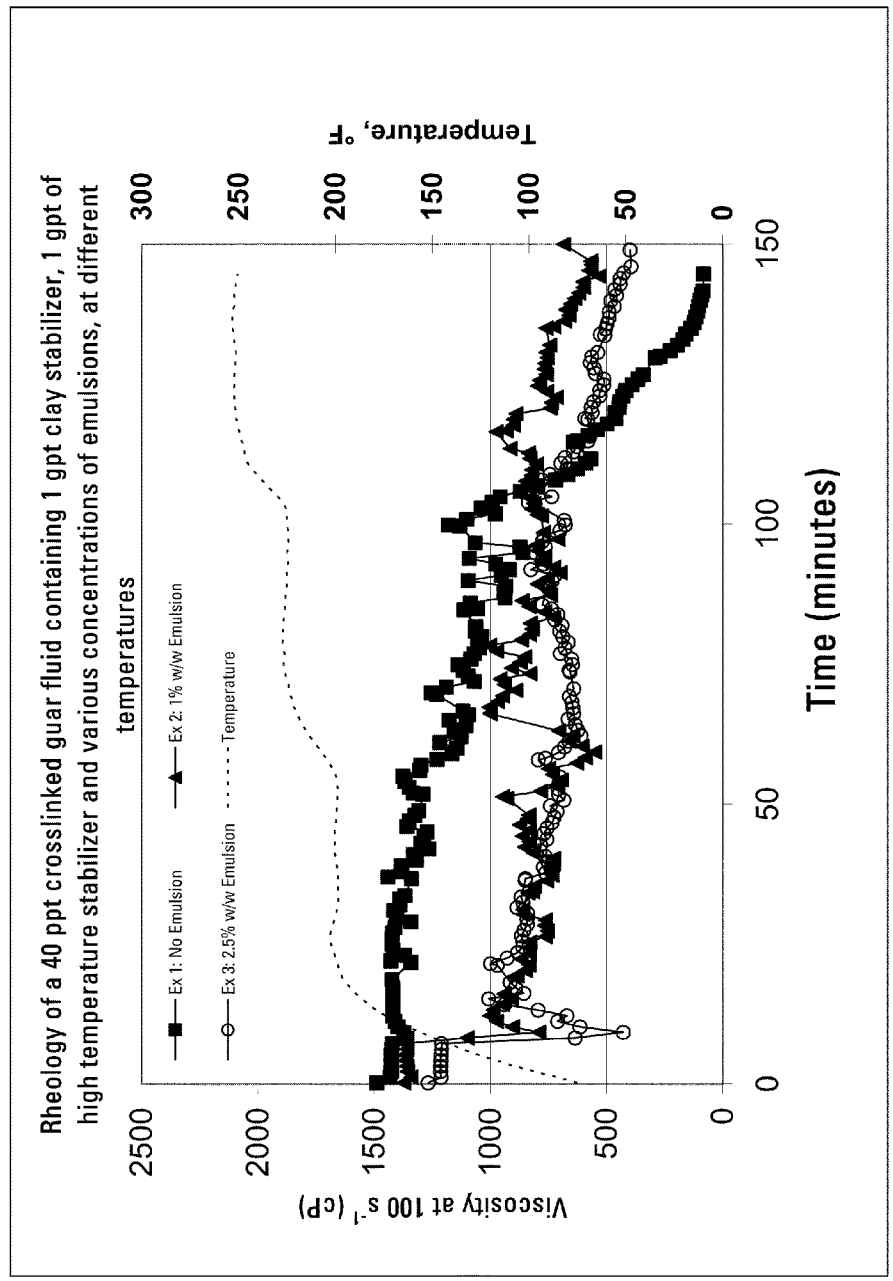
FIG. 1 shows, by graphical representation, the measured viscosity of fluids with and without emulsion type water inert polymer.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

In embodiments of the disclosed method, fluid loss control during fracture treatments may be improved by the use of water inert polymers, which includes water inert polymer particles. As a result of including the polymers, the efficiency of the fracture treatments are surprisingly improved. As used herein, "water inert polymers" refers to polymers which during a well treatment time period, have no substantial affinity for water, are not significantly water interactive, nor do they substantially expand or increase (as in size, volume, or numbers) beyond a normal or original limit. Water inert polymers differ from hydratable polymers, which at least partially dissolve in water and are commonly used in treatment fluids as viscosifying agents. Water inert polymers also differ from hydrophilic swelling polymers (oftentimes referred to as "superabsorbing particles", "hydrogels", "water swellable polymers", "water swellable particles" and the like) based on synthetic polymers that are unable to hydrate, but when interacting with water, may swell up to many times their original size, such as those described in U.S. Pat. No. 6,169,058. As used herein, the term "ppt" describes the concentration of a material, or materials, in pounds per thousand gallons fluid. Also, the term "gpt" is defined as gallons per thousand gallons of fluid.

Although not bound by or limited to any particular theory or mechanism of operation, fluid loss control during treatments may be improved by the use of water inert polymers due to film forming. For example, a substantially water impermeable film, also referred to as a "membrane" for purposes herein, may be deposited on the fracture face as a result of dehydration or agglomeration of the water inert polymer. The formation of a water inert polymer based film arises from "coalescence" of the polymer or polymer particles, such as latex particles or emulsion particles, which are normally separated by stabilizing forces (electrostatic or steric) augmented with a stabilizing surfactant. These forces may be overcome upon evaporation or dehydration of the continuous liquid carrier phase. See "An Overview of Polymer Latex Film Formation and Properties", P. A. Steward, J. Heam, & M. C. Wilkinson, Advances in Colloid and Interface Science, 85 (2000) 195-267). Thus, the water inert polymer is delivered to the formation fracture faces dispersed and stabilized in an aqueous medium, the water and stabilizing the surfactant is then substantially removed by loss into the formation while the water inert particles remain within or near the fracture region, thus forming a film on the fracture faces. The water inert particles may or may not substantially enter pores on the formation fracture faces.

In some embodiments, after placement of proppant in the fracture using a proppant laden fluid which may or may not contain a viscosifier, the film formed from the water inert polymers may be broken down or degraded during flowback and/or production stages. Film degradation may be achieved by delayed breakers (such as conventional oxidizers or by oxidizers triggered by a catalyst contained in the film), by hydrolysis of a latent acid such as polylactic acid (PLA) or polyglycolic acid (PGA) based fibers deposited with the film, by temperature, by instability of the film in formation fluids, by dissolution of the film in formation fluids, and the like. Formation production may be increased because little or no filter cake of highly concentrated polymer is formed which typically reduces the available fracture width, promotes viscous fingering, generates a high yield stress fluid and alters the pack porosity and permeability. Also, less matrix damage from leak off of damaging fluid exists. Further, breaker efficiency can be optimized in conjunction with the placement of the water inert polymer. Methods of the invention may significantly limit the damage caused by a high leak off during wellbore treatments using conventional treatment fluids, such as slickwater, polymer based fracturing fluids, viscoelastic surfactant based fracturing fluids, or foamed fluids, for example.

Another advantage provided by the invention is a potential decrease in the time and resources required to complete treatment operations. For example, a typical slickwater fracturing operation requires on the order of approximately 500,000 gallons of water be pumped into the wellbore over the course of treatment. In a typical polymer based treatment, commonly, on the order of approximately 100,000 gallons of water is required. These water volumes may be reduced by half or more, which may also translate into collateral decreases in job time, overall power output requirements, as well as fluid ingredient consumption. In those instances where requisite water volumes are not readily available, methods of the invention overcome such a limitation since resource consumption may be significantly reduced.

Yet another advantage of methods of the invention is a reduction in matrix damage due to a decrease in the amount of fluid which leaks off into the formation. Matrix damage can occur to some extent when viscoelastic surfactant based viscosifiers are used, or in the case of slickwater operations where the fluid has no significant proppant carrying capacity. In these cases, the leak off may be controlled by the viscosity of the fluid itself and the permeability of the reservoir. This advantage is particularly applicable for formations as low as 0.001 milli-Darcy (mD) permeability to as high as 1 Darcy permeability.

In some method embodiments of the invention, a polymer based aqueous fracturing fluid is introduced into the wellbore, but does not form a significant filter cake. In the case of conventional fluids where a significant filter cake is typically formed, the higher the leak off the more concentrated the polymer in the fracture will be, which increases viscous fingering effects and reduces significantly the effectiveness of breakers. Also the filter cake may behave as a yield stress fluid and becomes difficult to clean and remove from the fracture. By using film forming water inert polymer, the leak off may be significantly reduced and the polymer is concentrated in the fracture, improving the retained proppant pack conductivity and reducing the flow initiation pressure of the fracturing fluid during flowback.

Methods of the invention are suitable for treating formations containing petroleum products, such as oil and gas, as well as injection wells. Although the invention may be practiced in any suitable formation condition, the most practical temperature range of application is from about 20° C. to about 180° C. In preferred applications, formation permeability is about 100 Darcy or less.

In some embodiments of the invention, a film which is substantially gas permeable is formed. Such a gas permeable film may develop from the "coalescence" of water inert polymer particles, but only to such an extent that gas may permeate the film. Other practical means for forming such films will be readily known to those of skill in the art. For purposes herein, the term gas permeable film means a thin polymer film which selected gas molecules will pass, either through capillary pores in the film.

Because the water inert polymer does not impart substantial viscosity, in some embodiments the water inert polymer will be blended with a fluid (PAD fluid) containing a viscosifier and then may coat fracture faces with a substantially impermeable film as the fracture is created. The treatment (pad) fluids may be, among other things, linear, crosslinked, gelled, or foamed fluids formed with typical viscosifiers (i.e. polymers or viscoelastic surfactants) and additives known to those of skill in the art. When used in treatments, the pad (neat fluid) is commonly pumped first, or in some cases subsequent to a pre-PAD fluid, to create fractures and establish propagation (i.e. the fracture grows up and down as well as out). Then, a proppant laden slurry fluid is pumped into fractures, and may continue to extend the fractures and concurrently carry and place the proppant deep into the fractures. Nonlimiting examples of viscosifiers useful in pad fluids include conventional hydratable polymers such as guar and its derivatives, polyacrylamide and its derivatives, cellulose and its derivatives, xanthan, viscoelastic surfactants, sphingan heteropolysaccharides, and the like. Fluids using a water inert polymer in conjunction with a viscosifier are particularly useful for pad applications. In another embodiment, the water inert polymer will be used along with the first stage of a slickwater treatment with or without the friction reducers conventionally used with such treatments. The water inert polymer will then coat fracture faces with a substantially impermeable film as the fracture extends.

Some embodiments of the invention are based upon a three-step treatment. First is the introduction of the so-called pad or treatment fluid into the wellbore and formation, in which the water inert polymer is used to form a film, temporarily or permanently, which is substantially water impermeable. The film may form on the fracture faces due to dehydration and/or agglomeration of the water inert polymer. In the second step, which may or may not be simultaneous with the first step, conventional fracturing treatment fluid and proppant stages are introduced into the formation, showing minimal (significantly reduced) leak off due to the presence of the film. The third step is to achieve film breakdown during the flowback and production stages. Breakdown may be achieved by delayed breakers such as conventional oxidizers or by oxidizers triggered by a catalyst contained in the film, by hydrolysis of a latent acid such as PLA particles, granulated particles or fibers deposited with or after the film is placed, by temperature, by instability of the film in the presence of produced fluids, and the like.

The water inert polymers useful in embodiments of the invention are dispersed and stabilized in an aqueous medium. Any suitable means of stabilizing and dispersing the polymer in an aqueous medium may by used. The actual technique used is not particularly important as long as the polymer, or polymer particle, remains dispersed in the aqueous medium at least for the time period necessary for delivery to the formation.

As the water inert polymers encounter the formation rock in early stages of the treatment, it should be compatible with conventional fracturing fluids and not the rheological properties of a pad treatment. The water inert polymers should also be compatible with conventional additives, including, but not limited to, clay control additives, iron control additives, foamers, scale control additives, pH buffers, temperature stabilizers, and the like. Water inert polymers useful in the invention may provide reduced leak-off by forming a film to create a substantially water impermeable film on the fracture faces. The water inert polymers should be substantially removable. In order to allow for improved production the permeability of the fracture faces should be restored at least partially or locally such that the flow from the formation to the fracture can be resumed. Common breakers typically used includes conventional oxidizers with or without a catalyst, conventional enzymes, acids, latent acids such as PLA or PGA, or the like, and elevated temperature.

In some embodiments, the water inert polymer may be a latex resin (also termed latex polymer) stabilized in an aqueous medium. As used herein, the terms "latex resin", "latex", or "latex polymer" refers to a dispersion of a water inert polymer which may be prepared by polymerization techniques such as, for example, by emulsion polymerization, and further, includes polymers prepared by these techniques where the average diameter size of the dispersed polymer ranges from the nano scale, such as nanolatexes, to microgels which are on the order of from about $10^{-3}$ microns to about $10^3$ microns in diameter, including any functional diameter therebetween. The latex polymer may be an aqueous emulsion of finely divided polymer particles. Any practical blend of latex size may be used in accordance with the invention, such as a blend of a latex polymer and a nanolatex polymer. For purposes of this disclosure, the terms "latexes" and "lattices" have the same meaning.

Latex polymers are prepared synthetically by polymerizing monomers that have been emulsified with surfactants. For example, in preparing latex by emulsion polymerization, typically a surfactant is dissolved in water until a critical micelle concentration (CMC) is reached. The interior of the micelle provides the site necessary for polymerization. In some preparations, a monomer (like styrene, hydroxylethyl acrylate, methyl methacrylate, and the like) and a water-soluble free radical initiator are added and the whole batch is mixed to form the polymer. Core-shell latexes are also useful in some embodiments of the invention. Readily known to those of skill in the art, preparation of core-shell latexes is commonly performed by two-stage emulsion. In the first stage a water inert polymer is formed as the core by emulsion polymerization. In a second stage, polymerization of a shell surrounding the core is prepared by emulsion polymerization. Typically latex resins (polymers) are stabilized in the aqueous environment by surfactants, functionality of the shell in a core-shell latex, or combination of surfactant and functionality of the shell. Nonlimiting examples of latex types, which may be useful, include latexes of acrylic copolymers, polyvinyl alcohol, polyvinyl acetate, polyvinyl esters such as vinyl versatic acid, crosslinked polyvinyl alcohol, vinyl acetate, polyvinyl pyrrolidone, polystyrene, polystyrene butadiene copolymers, and the like. Any suitable latex may be used according to the invention. Some examples of latexes which may be useful include, but are not necessarily limited to, latexes available from Hexion Specialty Chemicals, Inc., Columbus, Ohio 43215, such as RHODOPAS® LS500, RHODOPAS® D2400, RHODOPASS® D2600, Schlumberger D500, or Schlumberger D600G. When incorporated as a water inert polymer, the latex polymer amount may vary from about 0.1% to about 50% by weight, based upon total fluid weight, The lower limit of the latex amount being no less than about 0.1, 0.5, 1, 2, 3, 4, 5, 6, 7, 8, 9, 10, or 15% by weight, based upon total fluid weight, and the upper limit being no greater than 50, 45, 40, 35, 30, 25, 24, 23, 22, 21, or 20% by weight, based upon total fluid weight. Preferably the latex is incorporated in an amount from about 1% to about 20% by weight, based upon total fluid weight, more preferably from about 5% to about 15% by weight, based upon total fluid weight.

Another approach is the use of an emulsion, where the water inert polymer is emulsified in the aqueous medium. As used herein, an "emulsion" refers to a dispersion of water inert polymers or water inert polymer particles in an aqueous medium with which the water inert polymers or water inert polymer particles will not readily mix. Some emulsions useful in the invention are mixtures of polymer and liquid, in which the polymer is dispersed in the liquid as small, microscopic or ultramicroscopic droplets (see colloid). Emulsions are stabilized by agents (emulsifiers) that form films at the droplets' surface and/or impart mechanical stability. Less-stabilized emulsions eventually separate spontaneously into two layers; more-stabilized ones can be destroyed by inactivating the emulsifier, by dehydration of the emulsifier, by concentrating the emulsion or by heating. Nonlimiting examples of emulsion types which may be useful in the invention include emulsions of polyethylene (PE), high density polyethylene (HDPE), polypropylene, polyethylene/polypropylene mixtures, paraffin, polyvinyl alcohol, epoxy polymer, polyurethane, crosslinked polyvinyl alcohol, crosslinked polyvinyl alcohol/polyvinyl acetate mixtures, and the like.

When incorporated as a water inert polymer, the emulsion polymer amount may vary from about 0.1% to about 50% by weight, based upon total fluid weight, The lower limit of the emulsion amount being no less than about 0.1, 0.5, 1, 2, 3, 4, 5, 6, 7, 8, 9, 10, or 15% by weight, based upon total fluid weight, and the upper limit being no greater than 50, 45, 40, 35, 30, 25, 24, 23, 22, 21, or 20% by weight, based upon total fluid weight. Preferably the emulsion is incorporated in an amount from about 1% to about 20% by weight, based upon total fluid weight, more preferably from about 5% to about 15% by weight, based upon total fluid weight.

Any suitable emulsion polymer may be used. Some examples of emulsions which may be useful according to the invention include, but are not necessarily limited to, those emulsions available from ChemCor, Chester, N.Y., 10918, USA, such as PolyEMULSION 330N35 which is a 35% solids, nonionic emulsion of Honeywell Corporation's AC 330 high density polyethylene, or polyEMULSION 629N40, that is a non-ionic, fine particle size emulsion of Honeywell Corporation's AC-629 polyethylene.

The water inert polymer may also be a water reducible polymer. By "water reducible" it is meant that the polymer is dispersible in water upon neutralization. Such polymers shall commonly be rendered water dispersible though ionic, non-ionic, ionic/nonionic hydrophilic functionality. Nonlimiting examples include low acid number water dispersible polymers, which may have ionic, or mixed ionic/nonionic stabilization.

The aqueous medium of fluids useful of the invention may be water or brine. Where the aqueous medium is a brine, the brine is water comprising an inorganic salt(s), organic salt(s), or mixture(s) thereof. Preferred inorganic salts include alkali metal halides, more preferably potassium chloride or ammonium chloride. The carrier brine phase may also comprise an organic salt more preferably sodium or potassium formate, or tetra-methyl ammonium chloride. Preferred inorganic divalent salts include calcium halides, more preferably calcium chloride or calcium bromide. Sodium bromide, potassium bromide, or cesium bromide may also be used.

Fluids useful in the invention may also include a viscosifier that may be a polymer that is either crosslinked or linear, a viscoelastic surfactant, or any combination thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published U.S. Pat. App. No. US 2004209780, Harris et. al.

In some method embodiments, the viscosifier is a water-dispersible, linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2/C_3$, $C_3/C_4$, or $C_2/C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{18}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

When incorporated, the polymer based viscosifier may be present at any suitable concentration. In various embodiments hereof, the gelling agent can be present in an amount of from about 10 to less than about 60 pounds per thousand gallons of liquid phase, or from about 15 to less than about 40 pounds per thousand gallons, from about 15 to about 35 pounds per thousand gallons, 15 to about 25 pounds per thousand gallons, or even from about 17 to about 22 pounds per thousand gallons. Generally, the gelling agent can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Hydroxypropyl guar, carboxymethyl hydroxypropyl guar, carboxymethyl guar, cationic functional guar, guar or mixtures thereof, are preferred polymers for use herein as a gelling agent. Fluids incorporating polymer based viscosifiers preferably have a viscosity value of at least about 100 centipoise at a shear rate of about 100 s$^{-1}$, at treatment temperature.

As a viscoelastic surfactant based viscosifier, any suitable viscoelastic surfactant may be used in accordance with the invention. Preferably the viscoelastic surfactant is an ionic VES. By ionic it is meant that the VES may be cationic, anionic or zwitterionic depending on the charge of its head group. When the surfactant is cationic, it is associated with a negative counterion, which can be an inorganic anion such as a sulfate, a nitrate, a perchlorate or a halide such as Cl$^-$, Br$^-$ or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na$^+$ or K$^+$. When it is zwitterionic, it is associated with both negative and positive counterions, for example, Cl$^-$ and Na$^+$ or K$^+$. Fluids incorporating VES based viscosifiers preferably have a viscosity value of at least about 50 centipoise at a shear rate of about 100 s$^{-1}$, at treatment temperature.

The viscoelastic surfactant may be, for example, of the following formulae: R-Z, where R is the hydrophobic tail of the surfactant, which is a fully or partially saturated, linear or branched hydrocarbon chain of at least 14 carbon atoms and Z is the head group of the surfactant which can be —NR$_1$R$_2$R$_3$$^+$, —SO$_3$$^-$, —, COO$^-$, or, in the case where the surfactant is zwitterionic, —N$^+$(R$_1$)(R$_2$)R$_3$—COO$^-$ where R$_1$, R$_2$ and R$_3$ are each independently hydrogen or a fully or partially saturated, linear or branched, aliphatic chain of at least one carbon atom; and where R$_1$ or R$_2$ can comprise a hydroxyl terminal group; or NR$_1$R$_2$O, where the surfactant is not charged, but an amine oxide.

In other embodiments a cleavable viscoelastic surfactant of the following formula may be used, which is disclosed in the International Patent Application WO02/064945: R—X—Y—Z, where R is the hydrophobic tail of the surfactant, which is a fully or partially saturated, linear or branched hydrocarbon chain of at least 18 carbon atoms, X is the cleavable or degradable group of the surfactant which is an acetal, amide, ether or ester bond, Y is a spacer group which is constituted by a short saturated or partially saturated hydrocarbon chain of n carbon atoms where n is at least equal to 1, preferably 2 and, when n is equal to or greater than 3, it may be a straight or branched alkyl chain, and Z is the head group of the surfactant which can NR$_1$R$_2$R$_3$$^+$, —SO$_3$$^-$, —COO$^-$ or, in the case where the surfactant is zwitterionic, —N$^+$(R$_1$R$_2$R$_3$—COO$^-$) where R$_1$, R$_2$ and R$_3$ are each independently hydrogen or a fully or partially saturated, linear or branched, aliphatic chain of at least one carbon atom, possibly comprising a hydroxyl terminal group. Due to the presence of the cleavable or degradable group, cleavable surfactants are able to degrade under downhole conditions.

A nonlimiting example of a suitable cationic viscoelastic surfactant useful for the implementation of the invention is the N-erucyl-N,N-bis(2-hydroxyethyl)-N-methyl ammonium chloride. In an aqueous solution of appropriate ionic strength, such as comprising 4 wt % KCl or 3 wt % NH$_4$Cl, this viscoelastic surfactant forms a gel containing worm-like micelles that entangle at surfactant concentrations above about 1 wt %. These worm-like micelles collapse to form spherical micelles when the gel is exposed to hydrocarbons, resulting in a loss of viscosity.

Nonlimiting examples of some suitable anionic viscoelastic surfactants useful for the implementation of the invention are monocarboxylates RCOO$^-$ such as oleate where R is $C_{17}H_{33}$ or di- or oligomeric carboxylates such as those disclosed in the International Patent Application WO 02/11874. These mono-, di- or oligomeric carboxylates form viscoelastic gels when in alkaline solution in the presence of added salts such as potassium chloride (KCl) or sodium chloride (NaCl). Worm-like micelles of said gel degrade to spherical micelles when the gel is broken by hydrocarbon.

Some examples of zwitterionic surfactants suitable for the implementation of the invention can be betaine surfactants having the general formula R—N(R$_1$R$_2$—Z where Z is an alkyl group or R—CN(R$_1$R$_2$R$_3$)—Z where Z is an acyl group. The hydrophobic group R can be aliphatic or aromatic, straight or branched, saturated or unsaturated. The anionic group Z of the surfactant can be —R'—SO$_3$—, —R'—COO— where R' is a saturated aliphatic chain. R$_1$, R$_2$ and R$_3$ are each independently hydrogen or an aliphatic chain of at least one carbon atom.

Advantageously, the VES concentration is below about 10 wt %, preferentially, below about 5 wt % and below about 20×c* where c* is the overlap concentration of the VES. More preferentially, it is comprised between about 0.2×c* and about 5×c*. This corresponds to VES concentrations far below the viscoelastic surfactant concentration used in viscoelastic surfactant fracturing fluids of the prior art, which are of the order of from about 30×c* to about 40×c*.

VES viscosified fluids used in some embodiments of the invention are hydrocarbon-responsive so that gel structures break down on contact or mixing with hydrocarbons. The long VES micelles, which form the gel network, degrade on contact with hydrocarbons to form spherical micelles. Then, the viscosity of the VES gel decreases to value of about 100 mPa-s or below, preferentially, about 20 mPa-s, at a high shear rate.

The fluids used in embodiments of the invention have a leak-off rate, which is below the leak-off rate of pure VES fluids of equivalent rheology. This is a very significant advantage, and as a result, the responsive fluid of the invention can be used. The fluid loss properties of the fluid can be further enhanced by the addition of colloidal particles, due to a synergistic effect between the fluid loss control additives and the water inert polymer molecules. Colloidal suspensions are typically dispersion of discrete very small particles, spherical or elongated in shape, charged so that the repulsion between the same charged particles stabilizes the dispersion, such as those disclosed in U.S. Pat. No. 7,081,439 (Sullivan, et al.), incorporated herein by reference thereto. Disturbance of the charge balance due for instance by removing the water, changing the pH or adding salt or water-miscible organic solvent, causes the colloidal particles to aggregate resulting in the formation of a gel. The particles are less than 1 micron in size, and typically in the range from about 10 to about 100 nanometers. Commercial solutions of colloidal particles typically include silica (also known as silica sol) and oxides of aluminum, antimony, tin, cerium, yttrium and zirconium. The particles are mostly spherical and particle sizes may range from about 8 nm to about 250 nm but elongated particles, with a length up to 300 nm are also available and were found to be also acceptable for the invention. The particles may have a negative or positive charge. To be effective as fluid loss control agent, the solution of colloidal particles are typically added at a concentration between about 0.1 and 0.5% (ratio of volume of colloidal solution to the total volume).

Included in fluids comprising the water inert polymer may be an optional acid particulate matter. The acid particulate matter may become embedded in, or be in adjacent contact with, the film deposited on the formation face during the placement of the film. The acid particulate matter may degrade, for example through hydrolysis or other formation factor or triggering event, to evolve acid monomers. The acid monomers may serve any of several functions including, but not limited to, film breaking, film void creation, pH decrease, and the like, or any combination thereof. As used herein, the term "dehydration" means substantially separating an aqueous medium from the acid particulate matter, notwithstanding the actual composition of the aqueous medium. The acid particulate matter used to form the packer generally comprises a solid acid particle that degrades, melts, or releases upon exposure to particular factors. Such factors include, but are not necessarily limited to time, temperature, pressure, hydration, or pH. As used herein, the term "acid particle" means an acid material which may be an acid monomer in an amorphous or crystalline solid state (solid acid), an acid contained within a solid capsule, shell, or coating (encapsulated acid), and the like. An acid particle may also comprise a polyacid in a solid form, amorphous or crystalline, which is the condensation product of certain organic acid precursors (acid monomers). Such organic acids are condensed by removal of water to form the polyacid.

Acid and acid ester particles useful in some embodiments of the invention may be solid or encapsulated. Any suitable acid or acid ester may be used. Examples of suitable acids for forming acid particles of the invention, which may be either solid acids or encapsulated liquid acids, include, but are not limited to, hydrochloric acid, sulfuric acid, phosphoric acid, phosphoric acid, nitric acid, formic acid, acetic acid, sulfamic acids, citric acid, glycolic acid, lactic acid When encapsulated, the acids may be encapsulated in accordance with the methods described in U.S. Pat. Nos. 5,373,901, 5,604,186, and 6,357,527 and U.S. patent application Ser. No. 10/062, 342, filed on Feb. 1, 2002 and entitled "Treatment of a Well with an Encapsulated Liquid and Process for Encapsulating a Liquid," each of which is incorporated by reference herein in its entirety. Other acids such as maleic acid, boric acid, oxalic acid, sulfamic acid, fumaric acid, other mineral acids, other organic acids, and the like. Sulfamic acid, boric acid, citric acid, oxalic acid, maleic acid, and the like, are some examples of suitable solid acids forming solid acid particles. The acid particle matter may be of any suitable particle size, range of particle size, grade of particles, or plurality of particle sizes, ranges, or grades. The acid particles may be manufactured in various solid shapes, including, but not limited to spheres, granules, fibers, beads, films, ribbons, strips, platelets, and the like.

Some acid particles useful in the invention hydrolyze under known and controllable conditions of temperature, time and/or pH to evolve the organic acid precursors. Any acid particle which is prone to such hydrolysis may be used in the invention. One example of a suitable acid particle is a solid polyacid formed from the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of glycolic acid (known as "glycolide"), which has a melting point of about 86° C. Yet another example suitable as solid acid-precursors are those polymers of hydroxyacetic acid (glycolic acid) ("PGA"), with itself or other hydroxy-, carboxylic acid-, or hydroxycarboxylic acid-containing moieties described in U.S. Pat. Nos. 4,848,467; 4,957,165; and 4,986,355. Another example is a copolymer of lactic acid and glycolic acid. These polymers and copolymers are polyesters. A particular advantage of these materials is that the solid polyacids and the generated acids are non-toxic and are biodegradable. The solid polyacids are often used as self-dissolving sutures. Some acid particles can also be formed by encapsulation of acid precursors such as esters, mono glycerides, diglycerides, triglycerides, polyacrylate copolymers polymethacrylate copolymers.

Mixtures of one or more acid particles may be used in some embodiments. The mixtures may be purely physical mixtures of separate particles of separate components. The mixtures may also be manufactured such that one or more acid particle and one or more solid acid-reactive materials is in each particle; this will be termed a "combined mixture". This may be done, by non-limiting examples, by coating the acid particle material with a solid acid-precursor, or by heating a physical mixture until the solid acid-precursor melts, mixing thoroughly, cooling, and comminuting. For example, it is common practice in industry to co-extrude polymers with mineral filler materials, such as talc or carbonates, so that they have altered optical, thermal and/or mechanical properties. Such mixtures of polymers and solids are commonly referred to as "filled polymers". In any case it is preferable for the distribution of the components in the mixtures to be as uniform as possible. The choices and relative amounts of the components may be adjusted for the situation to control the acid particle hydrolysis rate.

The amount of acid particle used will be dependent upon the particular requirements and environment presented. The preferred concentration range of acid particles is between from about 0.1 pounds per gallon of fluid (ppg) and about 8.34 ppg (between about 0.01 and about 1.0 kg/L). The most preferred range is between about 0.80 ppg and about 2.50 ppg (between about 0.1 and about 0.3 kg/L). One skilled in the art will know that for a given particle shape, flow rate, rock properties, etc. there is an optimum concentration, that can be calculated by one of ordinary skill in the art.

A gas component may optionally be incorporated into the fluids used in some method embodiments of the invention. The gas component of the fluids of the present invention may be produced from any suitable gas that forms an energized fluid or foam when introduced into the aqueous medium. See, for example, U.S. Pat. No. 3,937,283 (Blauer et al.) hereinafter incorporated by reference. Preferably, the gas component comprises a gas selected from the group consisting of nitrogen, air, argon, carbon dioxide, and any mixtures thereof. More preferably the gas component comprises carbon dioxide, in any quality readily available. The gas component may assist in the fracturing and acidizing operation, as well as the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

When a gas component is used in some method embodiments of the invention, any surfactant or foaming agent for which its ability to aid the dispersion and/or stabilization of the gas component into the base fluid to form an energized fluid as readily apparent to those skilled in the art may be used. Viscoelastic surfactants, such as those described in U.S. Pat. Nos. 6,703,352 (Dahayanake et al.) and 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates, and anionic surfactants containing at least one ethylenglycol unit. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the invention, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, 77478 USA). In other embodiments of the invention, the surfactant is a blend of two or more of the surfactants described above, or a blend of any of the surfactant or surfactants described above with one or more nonionic surfactants.

Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. Preferably the fluids incorporate the surfactant or blend of surfactants in an amount of about 0.02 wt % to about 5 wt % of total liquid phase weight, and more preferably from about 0.05 wt % to about 2 wt % of total liquid phase weight.

In some embodiments, the fluids used may further include a crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, antimony and zirconium.

The fluids used in some method embodiments of the invention may include an electrolyte which may be an organic acid, organic acid salt, or inorganic salt. Mixtures of the above members are specifically contemplated as falling within the scope of the invention. This member will typically be present in a minor amount (e.g. less than about 30% by weight of the liquid phase).

The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, and 3,4-dichlorobenzoic acid.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In a preferred embodiment of the invention, the electrolyte is potassium chloride. The electrolyte is preferably used in an amount of from about 0.01 wt % to about 12.0 wt % of the total liquid phase weight, and more preferably from about 1.0 wt % to about 8.0 wt % of the total liquid phase weight.

Fluids used in some embodiments of the invention may also comprise an organoamino compound. Examples of suitable organoamino compounds include, but are not necessarily limited to, tetraethylenepentamine, triethylenetetramine, pentaethylenhexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine.

Friction reducers may also be incorporated into fluids used in the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, hydrolyzed polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Breakers, in addition to those described above, may optionally be used in some methods of the invention. The purpose of this component is to "break" or diminish the viscosity of the fluid so that this fluid is even more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker (the borate anion), will allow the polymer to be crosslinked. Lowering the pH can just as easily eliminate the borate/polymer bonds. At pH values at or above 8, the borate ion exists and is available to crosslink and cause gelling. At lower pH, the borate is tied up by hydrogen and is not available for crosslinking, thus gelation caused by borate ion is reversible. Preferred breakers include 0.1 to 20 pounds per thousands gallons of conventional oxidizers such as ammonium persulfates, live or encapsulated, or potassium periodate, calcium peroxide, chlorites, and the like. In oil producing formations the film may be at least partially broken when contacted with formation fluids (oil), which may help de-stabilize the film.

A fiber component may be included in the fluids used in the invention to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Embodiments of the invention may use fluids further containing other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohols, scale inhibitors, corrosion inhibitors, fluid-loss additives, bactericides, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like.

Conventional propped hydraulic fracturing methods, with appropriate adjustments if necessary, as will be apparent to those skilled in the art, are used in the methods of the invention. One preferred fracture stimulation treatment according to the present invention typically begins with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be, and usually are, a gelled aqueous fluid, such as water or brine thickened with a viscoelastic surfactant or with a water soluble or dispersible polymer such as guar, hydroxypropylguar or the like. The pad and carrier fluids may contain various additives. Non-limiting examples are fluid loss additives, crosslinking agents, clay control agents, breakers and the like, provided that the additives do not affect the stability or action of the fluid.

The procedural techniques for pumping fracture stimulation fluids down a wellbore to fracture a subterranean formation are well known. The person that designs such fracturing treatments is the person of ordinary skill to whom this disclosure is directed. That person has available many useful tools to help design and implement the fracturing treatments, one of which is a computer program commonly referred to as a fracture simulation model (also known as fracture models, fracture simulators, and fracture placement models). Most if not all commercial service companies that provide fracturing services to the oilfield have one or more fracture simulation models that their treatment designers use. One commercial fracture simulation model that is widely used by several service companies is known as FracCADE™. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)), which are incorporated herein by reference.

Embodiments of the invention may also include placing proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

EXAMPLES

Examples 1 through 3

In these examples the water inert polymer, in the form of an emulsion, is blended with a conventional fracturing fluid during early stages of the treatment (pad), and the rheology of the fluid with and without the water inert polymer is compared to ensure that adequate viscosity is developed and maintained for fracturing. The pad fluid contained 40 ppt guar gum supplied by Economy Polymers and Chemicals, Houston, Tex. 77245-0246, the guar being crosslinked with a borate crosslinker (4 ppt of Boric Acid, with a pH adjusted to ~11 using a 30% weight aqueous solution of caustic soda). The emulsion added was ChemCor PolyEMULSION 330N35. The graph in FIG. 1 shows the viscosity, measured using a conventional Fann 50 rheometer, of the pad fluid containing no emulsion (Example 1), 1% by weight of Chem-Cor HDPE PolyEMULSION 330N35 emulsion based upon total fluid weight (Example 2), and 2.5% by weight of Chem-Cor HDPE PolyEMULSION 330N35 emulsion based upon total fluid weight (Example 3). The pad fluid also included DI water, contained a 50% by weight aqueous solution of tetra methyl ammonium chloride clay stabilizer added at 2 gpt, and 1 gpt of a 85% by weight solution of triethanol amine high temperature stabilizer.

The fluids of Examples 2 and 3 showed improved viscosity stability and rheology up to 250° F. This also illustrates that the water inert polymer emulsion is not degrading fluid performance and is therefore compatible with the pad fluid and conventional additives, such as clay stabilizers and temperature stabilizers, used in fracturing operations. Also tested and providing like rheology trends was ChemCor's polyEMULSION 629N40 emulsion polymer.

Examples 4 through 7

Figure 2:
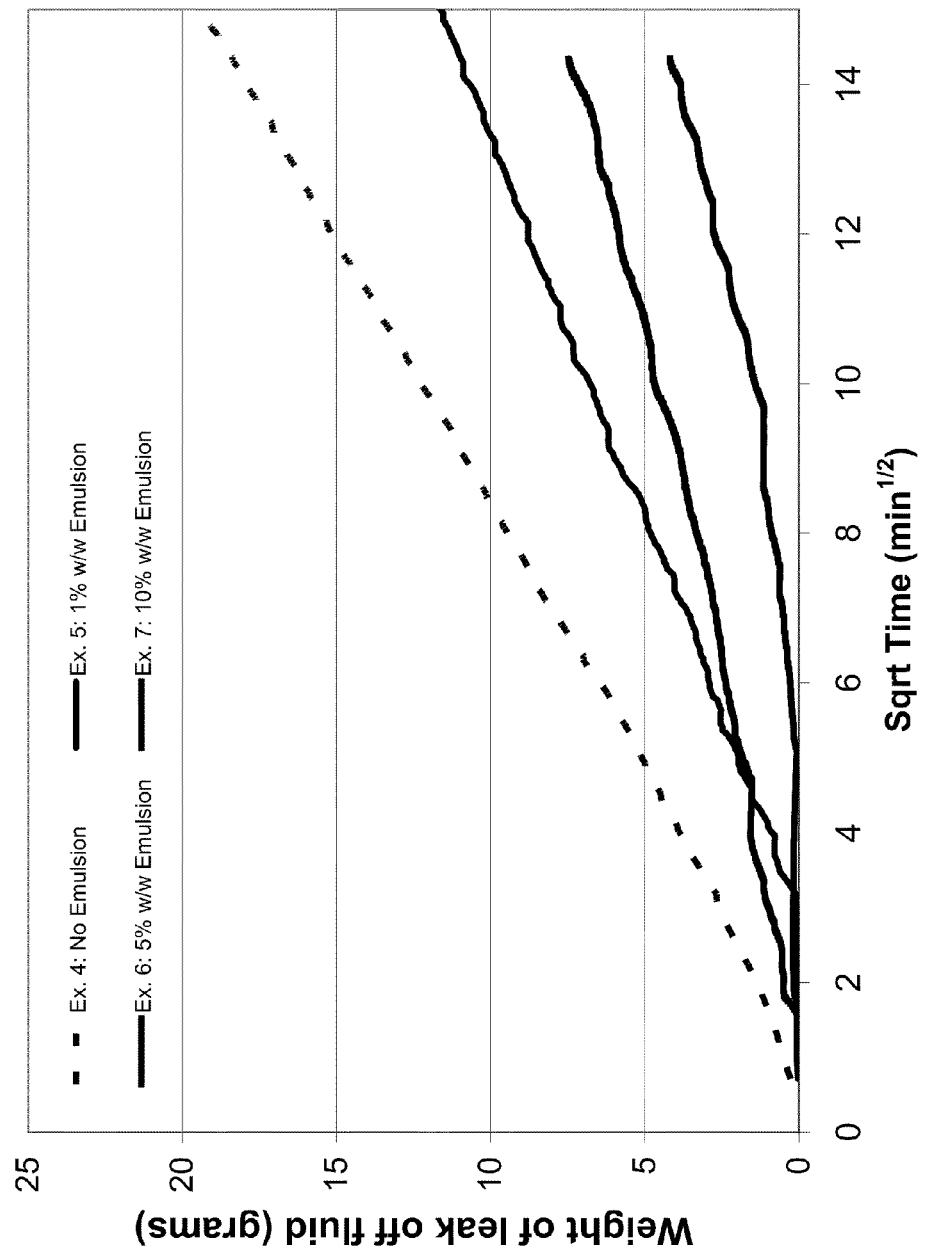
FIG. 2 illustrates fluid loss improvements for fluids containing emulsion water inert polymer blended with conventional fracturing pad fluids.

In examples 4 through 7, and referring to FIG. 2, the fluid loss is measured on samples with a water inert polymer, in the form of an emulsion, blended with conventional fracturing pad fluids, and fluid loss is determined for the fluid with and without the water inert polymer. The pad fluids contained 25 ppt guar gum supplied by Economy Polymers and Chemicals, the guar being crosslinked with a borate crosslinker (4 ppt of Boric Acid, with a pH adjusted to ~11 with caustic soda). The pad fluid also included DI water, contained a 50% by weight aqueous solution of tetra methyl ammonium chloride clay stabilizer added at 2 gpt, and 1 gpt of a 85% by weight solution of triethanol amine high temperature stabilizer. In examples 5 through 7, the emulsion added was ChemCor PolyEMULSION 330N35.

The fluids were evaluated on a static fluid loss cell using 1" diameter cores of varied permeability at temperature with 1200 psi total pressure and 200 psi back pressure, for a net pressure of 1000 psi. The cores (Nugget sandstones cores) of permeability 1.4 mD without emulsion (Example 4), with 1% by weight of emulsion based upon total fluid weight (Example 5) (core permeability 2.1 mD), with 5% by weight of emulsion based upon total fluid weight (Example 6) (Core permeability 3.2 mD), and 10% by weight of emulsion based upon total fluid weight (Example 7) (Core permeability 2.7 mD). As shown in the curves of FIG. 2, these examples illustrate how the inclusion of a water inert polymer at increased concentration into the pad fluid significantly and progressively decreases fluid leak-off.

Examples 8 through 15

Figure 3:
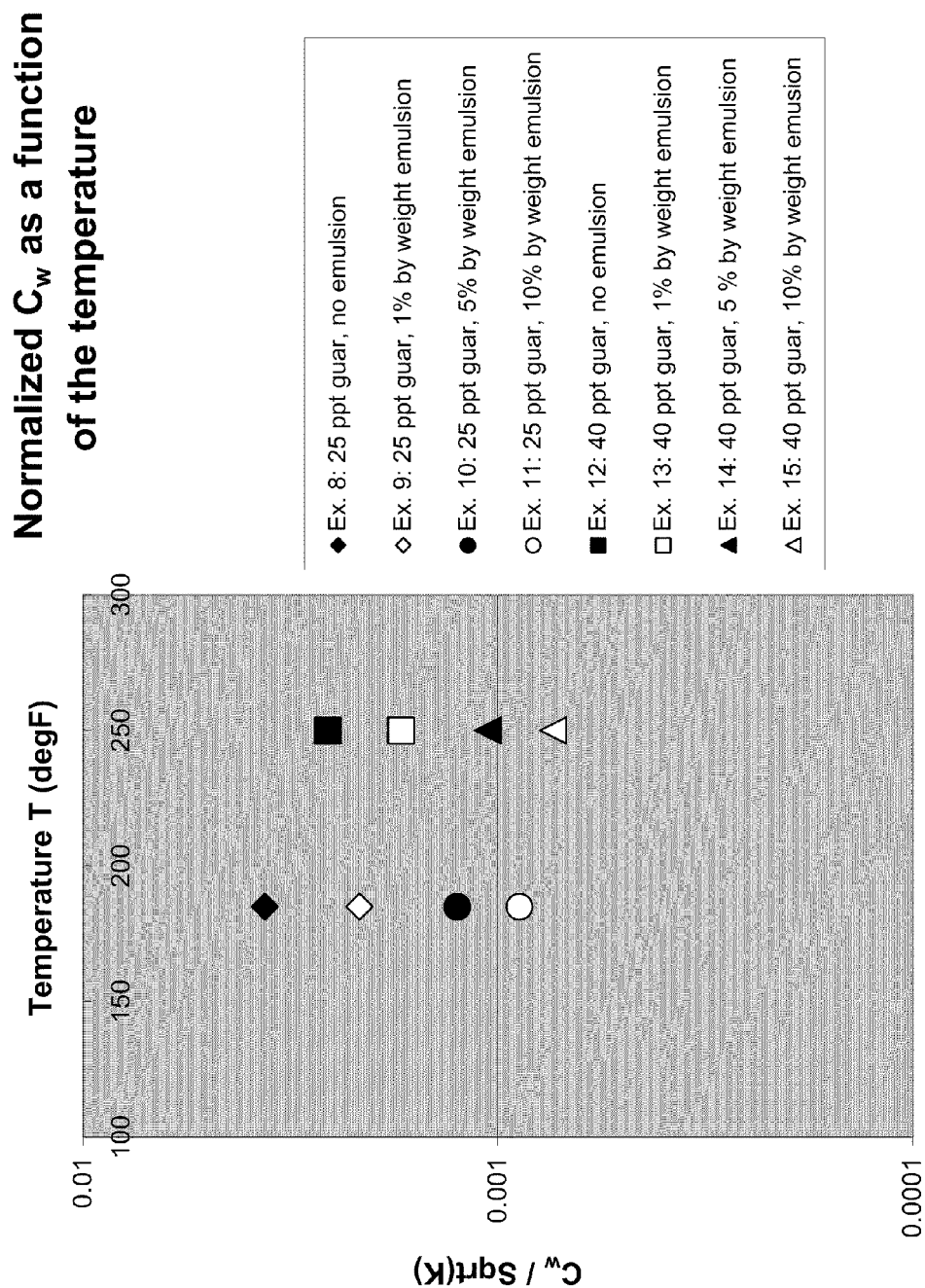
FIG. 3 represents normalized leak-off coefficients ($C_w$/Sqrt(K)) for pad fluids with and without emulsion type water inert polymers.

For examples 8 through 15, pad fluids, formulated in accordance with the pad fluids of examples 1 and 4 above, with and without either ChemCOR PolyEMULSION 330N35 or polyEMULSION 629N40, were tested at different temperatures and normalized leak-off coefficients ($C_w$/sqrt(K)) determined and reported in FIG. 3. $C_w$ is discussed in Navarrete, R. C., Caweizel, K. E., and Constien, V. G.: "Dynamic Fluid Loss in Hydraulic Fracturing Under Realistic Shear Conditions in High-Permeability Rocks," SPE Production and Facilities, pp 138-143 (August, 1996). To determine leak-off rates, experiments were conducted in a conventional static fluid loss cell at 1200 psi total pressure and a back pressure of 200 psi, giving a total net pressure across the core of 1000 psi. The core was held at constant temperature, as indicated in FIG. 3, and the fluid collected at the discharge of the core. The rate of fluid leaking off through the core was measured as a function of time. The slope of the volume leaking off as a function of the square root of time was measured and reported as being the $C_w$ coefficient. The $C_w$ coefficient was divided by the square root of the permeability (an indication of the diameter of the pore size of the core used) to normalize the leak-off rate. Using this normalization approach, the $C_w$ coefficients for a given system will be consistent over the range of permeabilities tested. As shown in FIG. 3, the inclusion of a water inert polymer into the pad fluid significantly improves significantly fluid leak-off. $C_w$ is expressed in units of ft/mm$^{1/2}$, while $C_w$/Sqrt(K) in units of ft/(mm$^{1/2}$*milli-Darcy$^{1/2}$)

Examples 16 and 17

Figure 4:
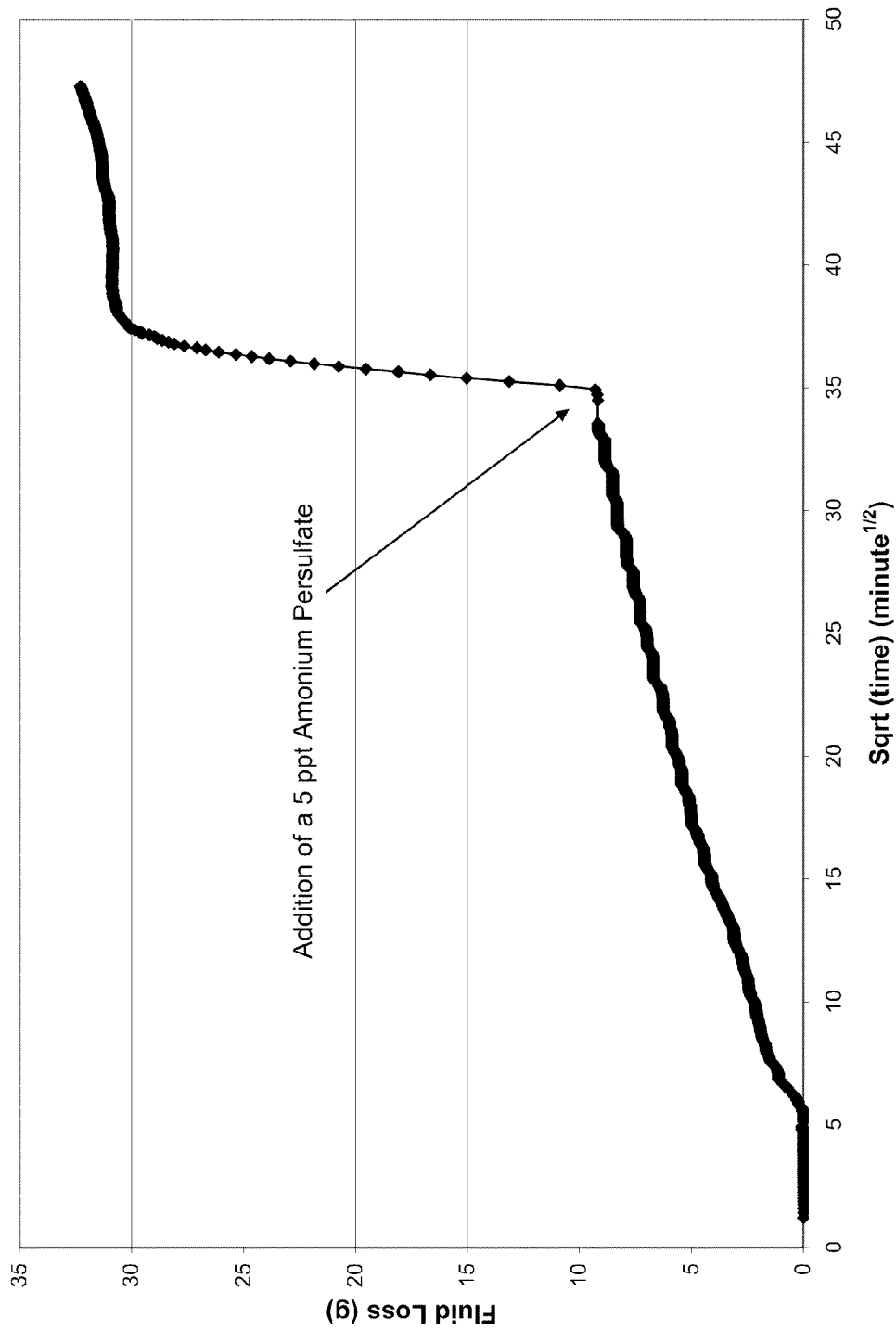
FIG. 4 indicates the effect of removing an emulsion based film using an ammonium persulfate breaker.

Fluid loss tests using a conventional static fluid loss cell, with cores 1" in diameter and 3.61 mD permeability, at 185° F., 1200 psi total pressure, and 200 psi back pressure, were run with and without persulfate breaker to evaluate film removal. FIG. 4 displays the fluid loss of a 40 ppt crosslinked gel formed from guar gum from Economy Polymers and Chemicals crosslinked with 5 ppt of boric Acid, along with ChemCOR polyEMULSION 629N40 added at 10% by weight based total fluid weight, where the pH of the solution was adjusted to pH ~11 using a 30% solution by weight of caustic soda solution. The aqueous fluids contained 2 gpt liquid clay stabilizer (a 50% solution by weight of tetra methyl ammonium chloride in water solution) and a high temperature stabilizer at 2 gpt liquid (a 25% solution by weight of triethanol amine) In example 16, ammonium persulfate was incorporated in the fluid at 5 ppt and placed in a first cell (Example 16) at the time indicated by the arrow on FIG. 4. No persulfate was placed in a second cell (Example 17), and the fluid loss rate was not significantly changed. Potassium periodate was also evaluated in similar fashion and proved to be effective.

In Examples 18 through 39, water inert polymers formed of latexes were evaluated illustrating their performance according to the invention.

Examples 18 through 23

Figure 5:
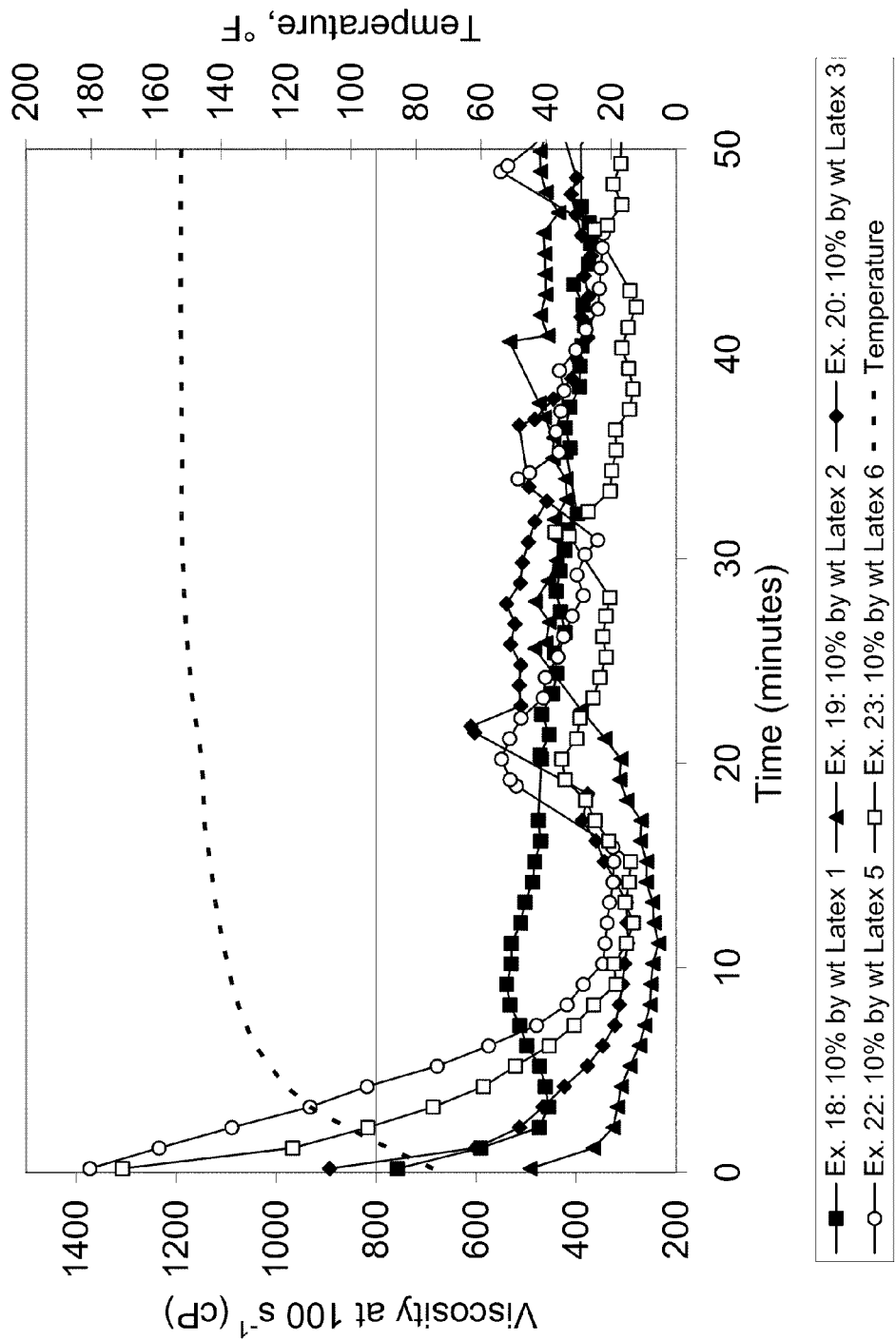
FIG. 5 shows the rheology of a 25 ppt crosslinked guar system containing 2 gpt of a liquid clay stabilizer solution and a nanolatex based water inert polymer.

Several available latex polymers were evaluated for their rheological effect on treatment fluids. They included nanolatex of acrylic copolymer latexes of VA/VeOVA, MMA (vinyl acetate, vinylester of versatic acid, methyl methacrylate), etc. In these cases the latexes did not have enough viscosity to create the fracture itself, however, blended with conventional fracturing fluids they showed good rheology. For example FIG. 5 shows the rheology of a 25 ppt crosslinked guar system prepared with 2 gpt of a liquid clay stabilizer solution. The 25 ppt gel was crosslinked with 4 ppt boric acid and the pH was adjusted to 11 with caustic soda. In all cases, the latex polymer studied was added to the fluid at a rate of 10% by weight, based upon total fluid weight.

Latex 1 (Example 18) is a nanolatex of acrylic copolymers, RhodoPASS® LS 5000 supplied by Rhodia, latexes 2 (Example 19) and 3 (Example 20) are formed from vinyl acetate and vinylester of versatic acid, available as AV29 from Rhodia, latex 5 (Example 22) is based upon vinyl alcohol, vinyl versatate and dibutyl maleate, while latex 6 (Example 23) is formed from methyl methacrylate, acrylic acid, and 2-ethyl hexyl acrylate. The rheology of the fracturing fluid with and without the latexes is consistent and would allow for opening a fracture in the rock.

The latexes were also tested under different temperature with various loadings and the data were consistent across a large range of temperature. Temperatures ranged from 85° F. to 200° F. using concentrations from 1% to 20% by weight, based upon total fluid weight.

Examples 24 through 28

Figure 6:
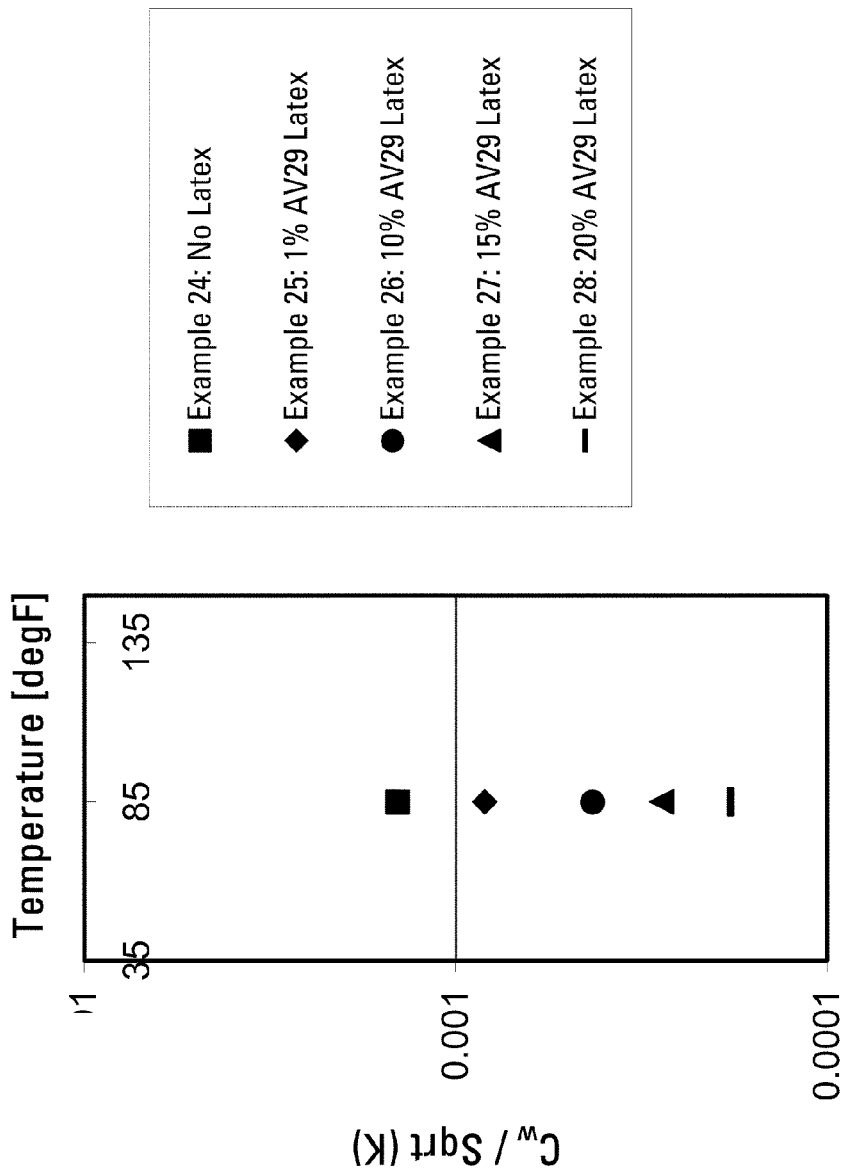
FIG. 6 is a plot of normalized $C_w$ coefficients measured on different cores at 85° F. with various amounts of latex water inert polymer.
Figure 7:
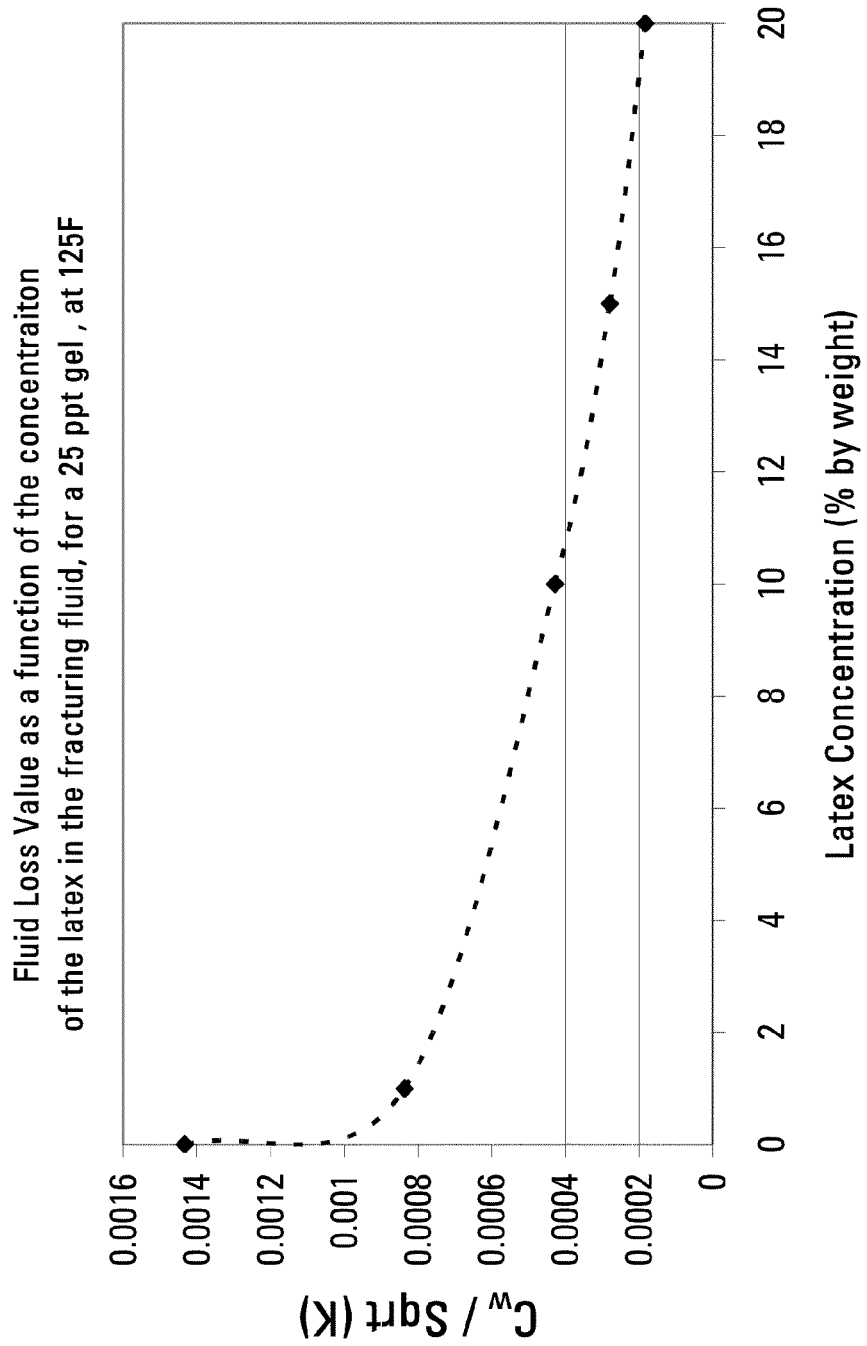
FIG. 7 shows the same data as FIG. 6, reported as normalized $C_w$ coefficient versus latex water inert polymer concentration.
Figure 8:
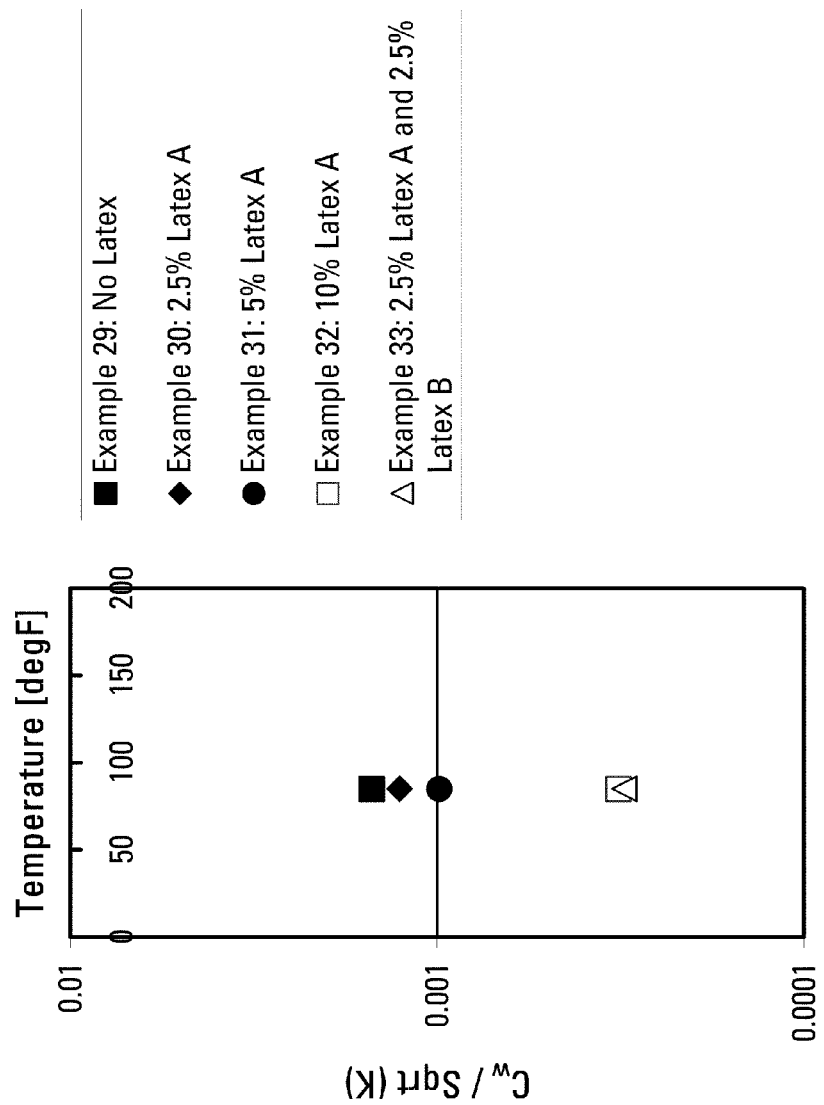
FIG. 8 graphically represents a plot of normalized $C_w$ coefficients for different latex water inert polymers, and blends thereof.

FIGS. 6, 7 & 8 represent the values of fluid loss measured for different cores using different latex concentrations at different temperatures. For example, FIG. 6 is a plot of the $C_w$ coefficients measured on 5 different cores at 85° F. with various amount of latex, examples 24 through 28. The $C_w$ coefficient have been normalized by the square root of the permeability of the core to take into account the estimated pore diameter of the core. Each point corresponds to a static fluid loss experiment run as described above for a 25 ppts gel (Guar from Economy Polymers & Chemicals) crosslinked with 5 ppt boric acid and where the pH was adjusted to pH ~10 with a 30% solution by weight of caustic soda. The fluid loss was measured and recorded at 85° F., and $C_w$ coefficient calculated and normalized against the square root of the permeability of the core and the data plotted for different latex concentrations. No latex was used for example 24. The latex used in examples 25 through 28 is a latex of vinyl acetate and VeOVA (branched alcohol) of average particle size 2 micrometer, supplied as AV29 from Rhodia. The latex was incorporated into the above fluids at the concentrations given in FIG. 6. FIG. 6 shows that increasing latex concentration lowers the fluid loss coefficient, and improves fluid efficiency. FIG. 7 is the same data as FIG. 6, but reported differently. In FIG. 7, the fluid loss coefficients are reported as a function of the latex concentration, thus further illustrating the advantage of incorporating water inert polymer to improve fluid efficiency. Note that in example 24, the $C_w$/Sqrt(K) is about 0.0014, and the addition of latex reduced this value to less than 0.0014, in all cases. For example 25, $C_w$/Sqrt(K) was about 0.0008, about 0.0004 for example 26, about 0.0003 for example 27, and about 0.0002 for example 28.

Examples 29 through 33

The graph in FIG. 8 is similar with that of FIG. 6, but differs in that different latexes, and blends of latexes, were used as film forming materials. Each point corresponds to a static fluid loss experiment run as described above for a 25 ppt gel (Guar from Economy Polymers & Chemicals) crosslinked with 5 ppt Boric Acid, and where the pH was adjusted to pH ~10 with a 30% solution by weight of caustic soda. The fluid loss was measured and recorded at 85° F., the $C_w$ coefficient calculated and normalized against the square root of the permeability of the core and the data plotted for different latex concentration or combination. In one case, a blend of latexes was used, where the latexes had different particle size. The latex A is a nanolatex acrylic copolymer from Rhodia supplied as RhodoPASS® LS 5000, having an average particle size of about 0.06 micrometer, while the latex AV29 from Rhodia is a latex of vinyl alcohol and other branched alcohols of about 2 micrometer average particle size. The data show that using a blend of two different latexes of different particle size increased significantly the efficiency of the film forming material, since the fluid loss coefficient of the film formed with 10% by weight of a latex A correspond to the same value as the fluid loss coefficient of a film formed with 2.5% of the latex blend with 2.5% nanolatex (example 33).

Examples 34 through 36

Figure 9:
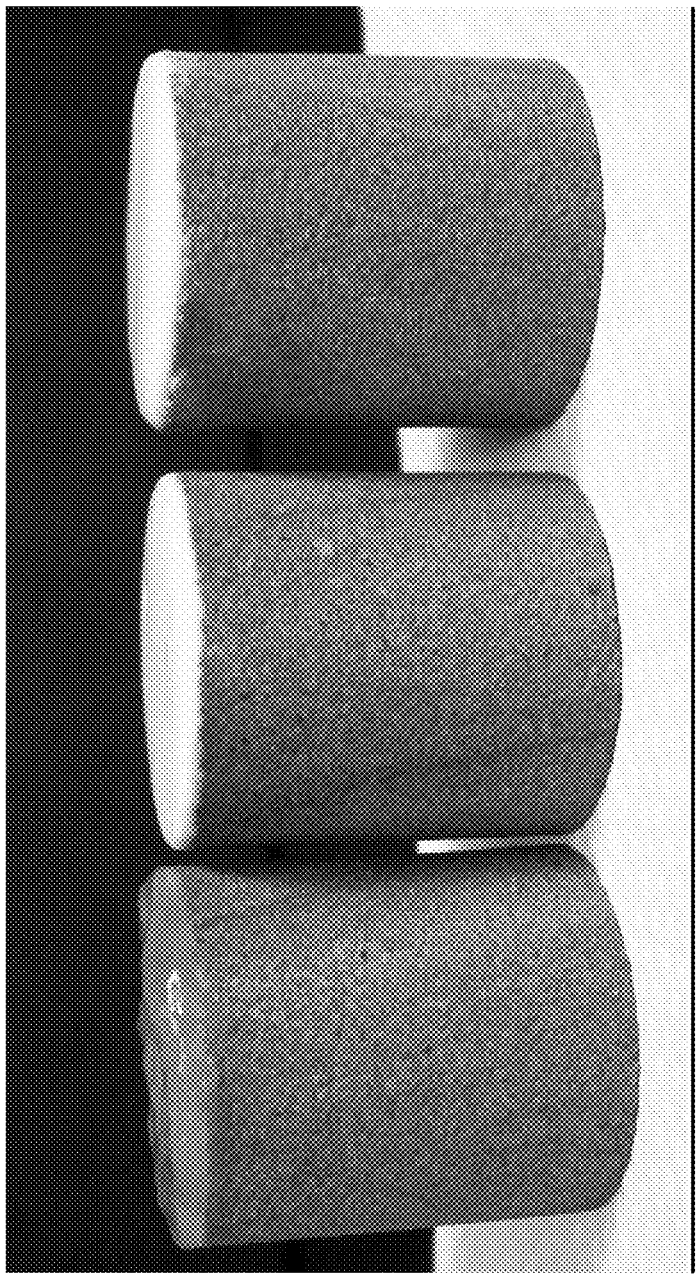
FIG. 9 illustrates the results of a conventional static fluid loss test using 1" cores for pad fluids with and without a latex water inert polymer.

FIG. 9 illustrates the results of a conventional static fluid loss test using 1" cores. The fluid loss was run at 1000 psi net pressure at 125° F. with a 25 ppt guar from Economy Polymer and Chemicals crosslinked with 5 ppt of Boric Acid and where the pH of the solution was adjusted using a 30% solution by weight of caustic soda to a value close to 10.5. The different fluid loss cells each contained the 25 ppt crosslinked gel, blended in a conventional liquid solution of clay stabilizer (a 50% solution by weight of tetra methyl ammonium chloride) and from the left to the right, no other additives (example 34), 15% by weight of AV22 latex available from Rhodia (a latex of VA/VeOVA of 2 micrometer in average particle size) (example 35), and 20% by weight of the same latex (example 36). The experiment was run over 4 hours and the cores were removed from the fluid loss cell and the pictures were taken. The picture on the left shows a conventional filter cake built from the 25 ppt crosslinked gel, while the pictures on the right show a much thinner film formed upon dehydration of the fluid and concentration of the latexes.

Examples 37 through 39

Figure 10:
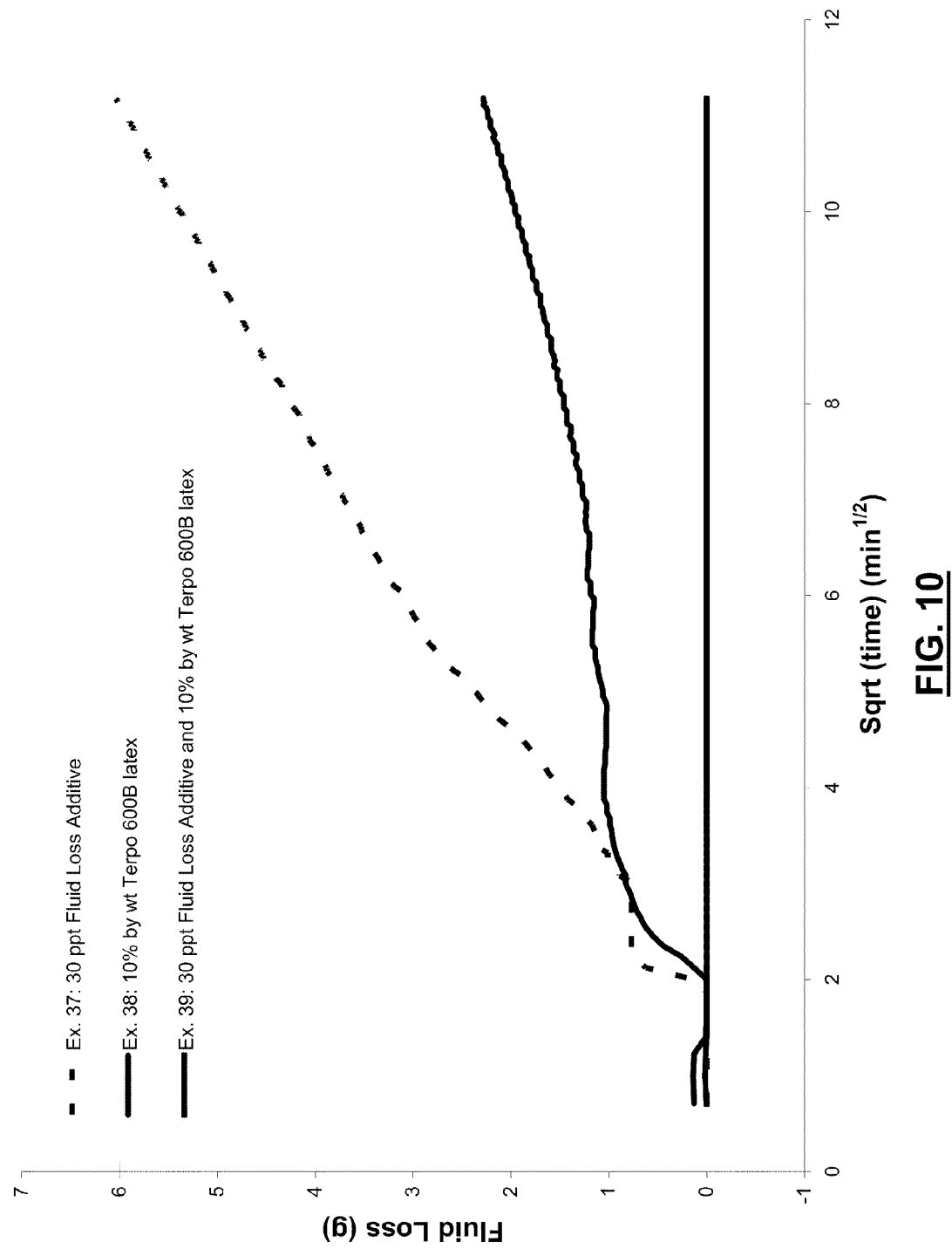
FIG. 10 illustrates the additional advantage of using a latex water inert polymer in conjunction with a fluid loss additive.

Referring now to FIG. 10, examples 37 through 39 illustrate the additional advantage of using a latex water inert polymer in conjunction with a fluid loss additive. The fluids were evaluated on a static fluid loss cell using 1" diameter cores of varied permeability at temperature. The fluid loss was run at 1000 psi net pressure at 100° F. with a 25 ppt guar from Economy Polymer and Chemicals crosslinked with 5 ppt of Boric Acid and where the pH of the solution was adjusted using a 30% solution by weight of caustic soda to a value close to 10.5. The different fluid loss cells contained each the 25 ppt crosslinked gel a conventional liquid solution of clay stabilizer (a 25% solution by weight of tetra methyl chloride). The cores used were of different but close permeabilities: (Nugget sandstones cores) 1.2 mD with the fluid loss additive (example 37), 2.6 mD with the 10% by weight latex suspension (example 38), and 2 mD with the mixture of fluid loss additive and the 10% suspension of latex (example 39). As shown in the curves of FIG. 10, these examples illustrate the synergy between the solid particles of the fluid loss additives with the latex particles, since the leak off is significantly reduced when the two components are added simultaneously. The fluid loss with conventional fluid loss additive is further improved when used with a water inert latex polymer. In this example the latex used is Latex Terpo 600B from Rhodia and the fluid loss additive used is a conventional mixture of starch and mica.

Examples 40 and 41

Figure 11:
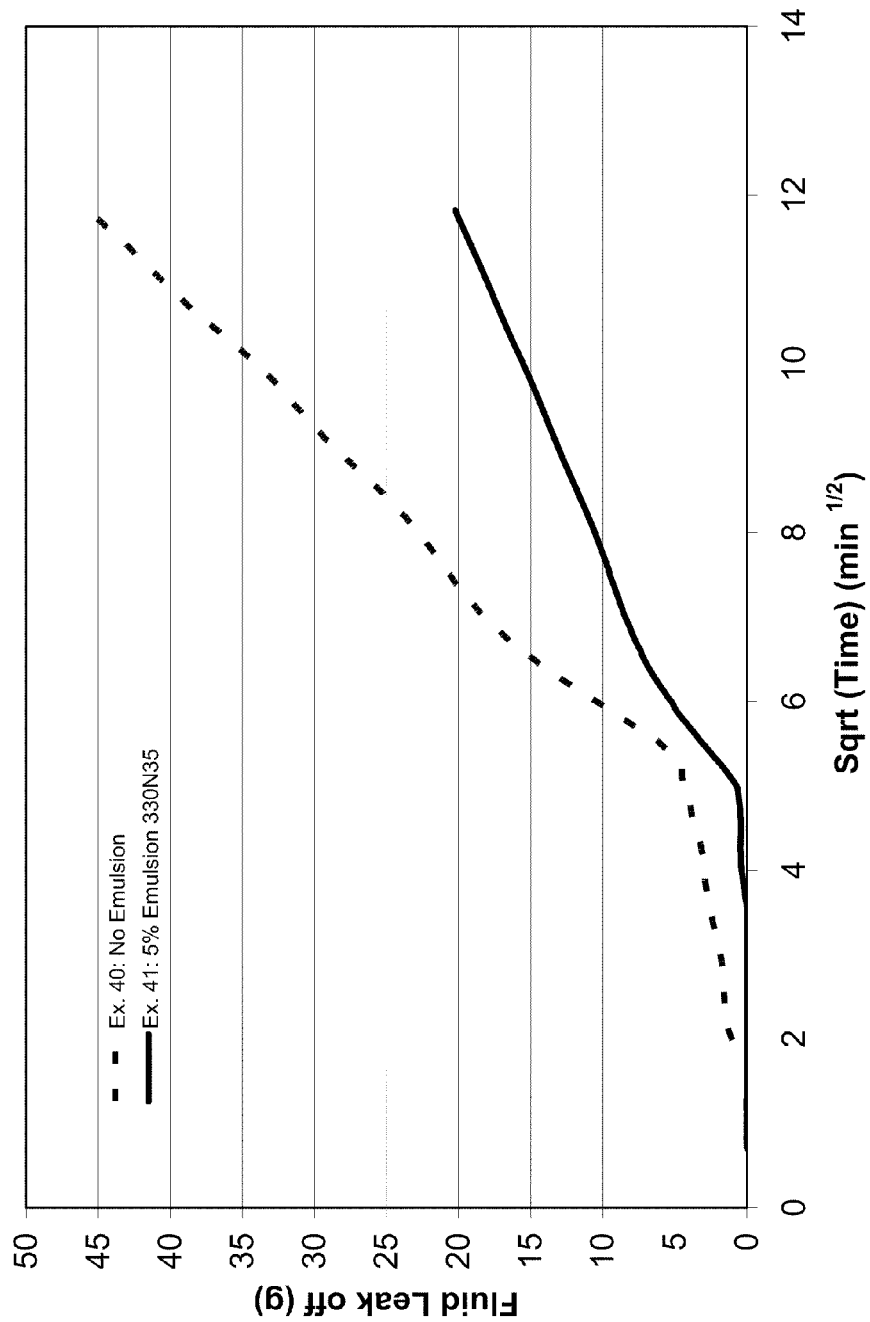
FIG. 11 shows leak off rates for VES based pad fluids with and without emulsion water inert polymers.

Referring to FIG. 11, and examples 40 and 41, here the fluids were evaluated on a static fluid loss cell using 1" diameter cores of varied permeability at temperature. The fluid loss was run at 1000 psi net pressure at 100° F. with a 10% by weight of viscoelastic surfactant (VES) based viscosifier solution. The VES solution included about 60% by weight (Z)-13 docosenyl-N-N-bis(2-hydroxyethyl)methyl ammonium chloride, about 13% by weight propane-1,2-diol, about 20% by weight propan-2-ol, and about 7% water. The VES solution was evaluated without (example 40) and with a 5% by weight of ChemCOR PolyEMULSION 330N35 (example 41). The cores had permeability values of about 2.3 mD. The different fluid loss cells each contained a conventional liquid solution of clay stabilizer (4% by weight of Potassium Chloride). As shown in the curves of FIG. 11, these examples illustrate that the fluid loss is significantly decreased for VES carrying fluids with the use of a film forming material.

Although the methods have been described here for, and are most typically used for, hydrocarbon production, they may also be used in injection wells and for production of other fluids, such as water or brine. The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of treating a subterranean formation penetrated by a wellbore, comprising:
   a. preparing an aqueous fluid comprising at least one water inert polymer, provided that no viscosifier is added to the aqueous fluid to substantially increase the fluid viscosity;
   b. injecting the aqueous fluid into the wellbore at a pressure equal to or greater than the formation's fracture initiation pressure; and
   c. thereafter injecting into the wellbore a proppant laden fluid at a pressure equal to or greater than the formation's fracture initiation pressure;
   wherein the water inert polymer forms a film on fracture faces, the method further comprising degrading the film subsequent to injecting the proppant laden fluid.

2. The method of claim 1, wherein the water inert polymer comprises one or more latex polymers or one or more emulsion polymers or a combination thereof.

3. A method of treating a subterranean formation penetrated by a wellbore, the method comprising:
   a. preparing an aqueous fluid comprising at least one water inert polymer and a viscosifier; and,
   b. injecting the aqueous fluid into the wellbore at a pressure equal to or greater than the formation's fracture initiation pressure; and
   wherein the leak off coefficient for the aqueous fluid is less than about 0.0022 and wherein the at least one water inert polymer comprises at least one latex polymer.

4. The method of claim 3 further comprising:
   c. thereafter injecting into the wellbore a proppant laden fluid at a pressure equal to or greater than the formation's fracture initiation pressure.

5. The method of claim 4 wherein the at least one water inert polymer comprises at least one emulsion polymer.

6. The method of claim 4 wherein the viscosifier is selected from the group consisting of viscoelastic surfactants, natural polymers, derivatives of natural polymers, synthetic polymers, biopolymers, and the like, or any mixtures thereof.

7. The method of claim 4 wherein the viscosifier is selected from the group consisting of natural polymers, derivatives of natural polymers, synthetic polymers, and biopolymers, the viscosifier incorporated in an amount less than about 30 lbs per thousand gallons of aqueous treatment fluid, preferably less than about 25 lbs per thousand gallons of aqueous treatment fluid, more preferably less than about 20 lbs per thousand gallons of aqueous treatment fluid.

8. The method of claim 3, wherein the water inert polymer further comprises one or more emulsion polymers.

9. A method for reducing matrix damage to a formation during a treatment operation, the method comprising injecting into a wellbore penetrating the formation, an aqueous treatment fluid comprising at least one water inert polymer, wherein the leak off coefficient for the aqueous fluid is less than about 0.0022, wherein the at least one water inert polymer forms a film on fracture faces.

10. The method of claim 9 wherein the fluid injected at a pressure equal or greater than the formation's fracture initiation pressure.

11. The method of claim 9, wherein the film is degraded and proppant is injected into the wellbore.

12. The method of claim 9, wherein the viscosity of the aqueous treatment fluid is more consistent from 85° F. to 200° F. than if no water inert polymer were present in the fluid.

13. The method of claim 9, wherein a leak off coefficient of the fluid is lower than if no water inert polymer were present in the fluid.

14. The method of claim 13, wherein the fluid efficiency is higher than if no water inert polymer were present in the fluid.

15. The method of claim 9, wherein the water inert polymer comprises one or more latex polymers or one or more emulsion polymers or a combination thereof.

* * * * *